United States Patent [19]

Laflin et al.

[11] Patent Number: 4,548,678
[45] Date of Patent: Oct. 22, 1985

[54] FLEXIBLE SHEET MATERIAL AND ARTICLES MADE THEREFROM

[75] Inventors: Philip Laflin, Bacup; Ian Eddleston, Milnrow; Mathew A. Hepworth, Cheadle Hulme, all of England

[73] Assignee: T&N Materials Research Limited, Manchester, England

[21] Appl. No.: 494,016

[22] Filed: May 12, 1983

[30] Foreign Application Priority Data

Jun. 10, 1982 [GB] United Kingdom ............... 8216931

[51] Int. Cl.$^4$ ............................................. D21F 11/00
[52] U.S. Cl. ..................... 162/146; 162/168.2; 162/164.6; 162/175; 162/181.9; 418/152; 428/288; 428/408; 428/326; 428/902
[58] Field of Search ............... 428/288, 290, 408, 367, 428/902; 162/164.6, 168.2, 181.9, 175; 418/152

[56] References Cited

U.S. PATENT DOCUMENTS

| | | | |
|---|---|---|---|
| 4,244,994 | 1/1981 | Trainor et al. | 428/902 |
| 4,259,397 | 3/1981 | Saito et al. | 428/902 |
| 4,320,823 | 3/1982 | Covaleski | 428/902 |
| 4,349,595 | 9/1982 | Trainor et al. | 428/902 |
| 4,443,517 | 4/1984 | Shah | 162/181.9 |

*Primary Examiner*—James J. Bell
*Attorney, Agent, or Firm*—Cushman, Darby & Cushman

[57] ABSTRACT

Flexible sheet material suitable for use in the manufacture of wear-resistant laminated articles such as bearings and rotor blades comprises particles of graphite and heat-resistant web-forming fibres, preferably of poly (aromatic amide), bound together with an organic binder, the proportions of the ingredients being:

| | |
|---|---|
| graphite | 20–95% |
| heat-resistant web-forming fibres | 3–78% |
| organic binder | 2–15% |

To make wear-resistant articles, sheets of the material are impregnated with resin, superimposed one upon another, and subjected to high pressure and elevated temperature.

5 Claims, No Drawings

FLEXIBLE SHEET MATERIAL AND ARTICLES MADE THEREFROM

This invention relates to flexible sheet material, and is particularly concerned with flexible sheet material which can be formed into wear-resistant laminated articles such as bearings and rotor blades for compressors.

One well known process for making such articles entails impregnating with a thermosetting resin a sheet of asbestos cloth which incorporates particles of graphite to impart low friction to the finished article, and then subjecting to high pressure and elevated temperature an assembly of superimposed sheets of the impregnated cloth. In another well known process, a mixture of the necessary ingredients is moulded in powder form.

The present invention provides a route to wear-resistant articles which, while retaining the operation of moulding resin-impregnated sheets (a much less expensive procedure than moulding a powder mix), avoids the use of asbestos. The invention also provides new flexible sheet material suitable for use in the manufacture of such articles.

The flexible sheet material of the invention comprises particles of graphite admixed with heat-resistant web-forming fibres, said particles and said fibres being bound together with an organic binder; said flexible sheet material being made by a process in which an aqueous slurry of the aforesaid ingredients is progressively dewatered as a layer on a water-permeable conveyor and the dewatered layer is subsequently compressed and dried, said flexible sheet material having said ingredients in the following proportions by dry weight:

| graphite particles | 20–95% |
| heat-resistant web-forming fibres | 3–78% |
| organic binder | 2–15% |

The graphite (which may be natural or synthetic) may be used in conjunction with such other low-friction substances as molybdenum disulphide and polytetrafluoroethylene.

If the eventual wear-resistant article in whose construction the sheet material is to be used is a dry runner (i.e. is not externally lubricated during operation), such as the bearings of a typewriter or of a xerographic apparatus, the graphite preferably forms at least 60% by weight of the sheet material, and particularly 70–90% by weight thereof. With sheet material intended for the construction of externally lubricated bearings or other parts required to be wear-resistant, the content of graphite is desirably less than 50% by weight, and is preferably 20–40%.

The function of the heat-resistant web-forming fibres is partly to enable the sheet material to be made on conventional paper-making machinery, that is to say, by a process in which an aqueous slurry of sheet-forming ingredients is progressively dewatered as a layer on a water-permeable conveyor (usually of woven wire), the dewatered layer being subsequently compressed and dried. Additionally, the heat-resistant web-forming fibres impart strength to the finished sheet material and to the moulded laminate which is to be formed from it. That strength persists at the elevated temperatures generated by friction between the moulded laminate and whatever moving part (e.g. a revolving shaft) it is required to support in use. Preferably the fibres are of poly (aromatic amides)—often called 'aramids'—such as poly (p-benzamide), which is available under the trade mark Kevlar, and poly (m-phenyleneisophthalamide) available under the mark Nomex. Alternatively, the fibres may be of glass, preferably of diameter below about 10 $\mu$m.

The organic binder may for example be cellulose pulp, starch, a synthetic elastomer, a phenolic resin or mixtures of these materials. The preferred binder is cellulose pulp, preferably in admixture with a synthetic elastomer deposited from a latex (i.e. from an aqueous dispersion of the elastomer) or starch or both. In preparing the sheet material, the binder is incorporated in dispersed form in the aqueous slurry of graphite and heat-resistant web-forming fibres which is progressively dewatered.

The sheet material is suitably made to be of thickness 0.25–1.5 mm. Its density is preferably in the range 0.4–0.8 kg/m$^3$.

To utilise the flexible sheet material in the manufacture of wear-resistant articles, it is first impregnated with a thermoplastic or thermosetting resin, suitably in an amount forming 30–60% of resin dry solids by weight of the impregnated sheet. Suitable thermosetting resins are phenol-formaldehyde resins derived from phenol itself or a substituted phenol such as a cresol, resins derived by reacting formaldehyde with a phenol-aralkyl resin (an aralkyl resin being one in which phenolic nuclei are linked together by aralkyl residues of the type —CH$_2$-arylene-CH$_2$—), melamine-formaldehyde resins and epoxy resins.

If the sheet material is to be used in the manufacture of wear-resistant articles intended for operation at temperatures not above about 200° C., the impregnant used may be a thermoplastic resin which is stable up to that temperature, such as a polyether sulphone resin: that sold under the trade mark Victrex 200P is very suitable.

After impregnation of the flexible sheet material, a number of pieces of appropriate size are cut from it and superimposed one upon another to form an assembly, which is then subjected to high pressure and elevated temperature. The temperature employed is (when a thermosetting resin is used) high enough to cure the resin fully or (when a thermoplastic resin is used) to soften it to such an extent that its particles fuse together. In either case, the particles of graphite and the heat-resistant web-forming fibres become securely embedded in the resin. Ordinarily, a temperature of at least 140° C. will be used with either type of resin. The high pressure to which the assembly is subjected at elevated temperature will usually be at least 3MPa and is designed to ensure complete bonding of the superimposed sheets to one another and formation of a dense matrix of suitably high compressive strength (preferably at least 100MPa) and flexural modulus (preferably at least 5GPa).

The invention is further illustrated by the following Examples.

EXAMPLE 1

This Example illustrates the preparation and use of flexible sheet material containing the following ingredients in the following proportions by weight

| | Parts by weight |
|---|---|
| Aramid fibre | 65% |
| Graphite (ground) | 28% |

|                          | Parts by weight |
|--------------------------|-----------------|
| Cellulose pulp           | 5%              |
| Nitrile rubber latex solids | 2%           |

A. Preparation of Stock i. Bleached softwood sulphate pulp (0.125 kg) in sheet form was made into an aqueous slurry of solids content 3% by weight, and treated in a disc refiner until its freeness value was 80° Schopper Riegler (SR).

ii. Aramid fibre (1.62 kg) sold under the description 'Kevlar dry pulp 6F218' was dispersed in water in a hydropulper for 20 minutes to form a slurry of solids content 2% by weight.

iii. 4.17 kg of pulp (i) and 81 kg of pulp (ii) were made up with water at a temperature of 40°–45° C. in a mixing chest to a total volume of 400 liters, and vigorously stirred.

iv. 0.7 kg of ground natural graphite (98% carbon; passing a sieve of aperture 33 μm) were added to the mixing chest and the suspension was vigorously stirred for 5 minutes.

v. Stirring was continued for 5 minutes and then 0.05 kg of a commercially available aqueous acrylonitrile-butadiene copolymer latex (acrylonitrile content of polymer, 33%; 32% solids content) diluted with 2.5 liters of cold water, was added.

vi. Stirring was continued for a further 5 minutes.

vii. The pH of the stock in the mixer was then reduced to 4 by the addition of papermakers alum (aluminium sulphate). The supernatant liquid that remained when stirring was stopped was clear, indicating that the rubber particles of the latex had all been precipitated, carrying the graphite particles onto the cellulose and aramid fibres.

B. Preparation of Paper

The stock (slurry) of A above was made into flexible sheet material in an entirely conventional way on a Fourdrinier flat wire paper machine, such as is described in chapters 10 and 11 of "Paper and Board Manufacture" by Julius Grant, James H. Young, and and Barry G. Watson (Publishers; Technical Division, the British Paper and Board Industry Federation, London 1978). The slurry is progressively dewatered as it travels on the water-permeable conveyor of the machine, and the dewatered material is consolidated by pressing between rollers, and then dried conventionally. The sheet material thus formed is wound on cylinders of diameter 100 mm.

The properties of the flexible sheet material obtained from the slurry of A are set out below:

| Thickness (mm)              | 0.875    |
|-----------------------------|----------|
| Mass/unit area (g/m$^2$)    | 465      |
| Density (kg/m$^3$)          | 531      |
| Tensile Strength (MPa)      |          |
| (a) MD (in machine direction) | 1.92 Mpa |
| (b) CD-(across machine)     | 1.70 MPa |

C. Conversion of Flexible Sheet Material to Moulded Wear-Resistant Article

The material of B was impregnated with the epoxy-modified phenol-aralkyl resin solution sold under the name Xylok 238 by dipping it into the solution. Excess resin solution was squeezed from the impregnated sheet by passing it between rollers, and the sheet was then heated at 155° C. for 10 minutes to remove solvent present in the retained resin solution and to part-cure the resin. From the material thus obtained, 20 pieces measuring 250×250 mm were cut. The pieces were superimposed one upon another, and the assembly of pieces was press-cured at 190° C. for 60 minutes under a pressure of 7.6MPa to give a laminate 7.5 mm thick containing 40% by weight of resin solids. The laminate was then post-cured to 175° C. over a conventional 48-hour cycle. Its properties are compared below with those of a commercially available laminate based on asbestos fabric and cresol-formaldehyde resin, such as is commonly used for manufacturing pump rotor blades.

|                          | Product         |                   |
|--------------------------|-----------------|-------------------|
|                          | This Example    | Asbestos Product  |
| Tensile Strength MPa     | 87              | 48                |
| Tensile modulus GPa      | 11              | 9.7               |
| Flexural strength MPa    | 105             | 86                |
| Flexural modulus GPa     | 9.7             | 10.3              |
| Compressive strength MPa | 229             | 241               |
| Izod impact strength J/m | 85              | 45                |

On continuous aging in air at 220° C. the laminate of the example declined in flexural strength to 80MPa after about 400 hours. Thereafter, for at least a further 900 hours the flexural strength remained constant.

By contrast the flexural strength of the asbestos-based product declined to 80MPa after only 250 hours at 220° C. and continued to lose strength after that.

A set of pump rotor blades was machined from the laminate of the Example and used for 1300 hours in a Conventional oil-lubricated rotary vane pump, discharging air in the pressure range 2–2.8 bar at 196°–224° C. The wear rate of the blade tip was found to be only 0.12 μm/hour compared with a wear rate of 2 μm/hour for asbestos-base blades tested under identical conditions.

EXAMPLE 2

This Example illustrates the use of flexible sheet material containing the following ingredients in the following proportions by weight:

|                      | Parts by weight |
|----------------------|-----------------|
| Aramid fibre         | 10%             |
| Graphite (ground)    | 80%             |
| Cellulose pulp       | 5%              |
| *Acrylic latex solids | 3%              |
| Potato starch        | 2%              |

*The latex was a commercially available anionic aqueous emulsion of a self-cross-linking acrylic copolymer curable at 120° C. or below, of total solids content 45.5% by weight and pH 4.0.

The flexible sheet material was made following generally the procedure of Example 1A and B in sheets 0.625 mm thick and of mass 650 g/m$^2$. It was converted to a wear-resistant laminate following generally the procedure of Example 1C, but with the following variations.

Impregnation was with the phenolic resol solution sold under the name Cellobond J/22/119S. Part-cure was at 115° C. for 2.5 minutes. Laminate press cure was at 150° C. for 30 minutes under a pressure of 7.6MPa to give a laminate 7.0 mm thick containing 37% by weight of resin solids. Post-cure was to 150° C. over a 36 hours cycle.

The properties of the laminate are compared below with those of a laminate made by conventionally compression-moulding a powder mix (not containing fibre) of grahite and phenolic resol in the weight proportions graphite:resin=70:30.

|  | Product | |
| --- | --- | --- |
|  | This Example | Compression-Moulded from Powder |
| Tensile strength MPa | 54 | 27 |
| Tensile modulus GPa | 12.8 | 19.3 |
| Flexural strength MPa | 78 | 69 |
| Flexural modulus GPa | 11.8 | 12.2 |
| Compressive strength MPa | 134 | 127 |
| Izod impact strength J/m | 30 | 14 |

Rotor blades were machined from the above products and were used for 95 hours in a dry-running rotary vane pump discharging air at 1.35 bar at a temperature of 180° C. Blade tip wear (much higher than in Example 1 because of the absence of external lubrication) was as follows:

| Product of the Example | 16 μm/hr |
| --- | --- |
| Product compression/moulded from powder | 13 μm/hr |

EXAMPLE 3

Flexible sheet material as used in Example 2 was impregnated with the two-part epoxy resin sold under the name Araldite LZ576 with hardener HZ576.

Part cure was at 100° C. for 15 minutes. 15 laminae were press cured at 160° C. for 60 minutes under a pressure of 3.8MPa to give a laminate 7 mm thick containing 40% by weight of resin solids. Post-cure was to 175° C. over a 58-hour cycle.

The properties of the laminate are compared with those of a product compression-moulded from powder:

|  | This Example | Compression-Moulded from Powder |
| --- | --- | --- |
| Tensile Strength MPa | 53 | 27 |
| Tensile Modulus GPa | 10.8 | 19.3 |
| Flexural Strength MPa | 94 | 69 |
| Flexural Modulus GPa | 11.4 | 12.2 |
| Compressive Strength MPa | 159 | 127 |
| Izod Impact Strength J/m | 29 | 14 |

Rotor blades were machined from a laminate prepared according to this Example and were run for 178 hours in a dry-running rotary vane pump discharging air at 2.5 bar at a temperature of 180° C. Blade tip wear was measured to be:

| Product of the Example | 10 μm/h |
| --- | --- |
| Product compression moulded from powder | 13 μm/h |

We claim:

1. A wear resistant lubricated bearing or rotar blade for a lubricated vane pump, said bearing or rotor blade having high compressive strength and molded from a non-asbestos flexible sheet material comprising particles of graphite admixed with heat-resistant web-forming fibres of a poly(aromatic amide), said particles and said fibres being bound together with an organic binder; said flexible sheet material being made by a process in which an aqueous slurry of the aforesaid ingredients is progressively dewatered as a layer on a water-permeable conveyor and the dewatered layer is subsequently compressed and dried, said flexible sheet material having said ingredients in the following proportions by dry weight:

| graphite | 20-40% |
| --- | --- |
| heat-resistant web-forming fibers of poly(aromatic amide) | 45-78% |
| organic binder comprising cellulose pulp | 2-15% |

2. Flexible sheet material according to claim 1, in which the binder is a mixture of cellulose pulp and an elastomer deposited from a latex.

3. Flexible sheet material according to claim 2, in which the binder also contains starch.

4. Wear-resistant article of high compressive strength made by subjecting to high pressure and elevated temperature an assembly of superimposed sheets of flexible sheet material according to claim 1 which have been impregnated with a thermosetting or thermoplastic resin.

5. Wear-resistant article according to claim 4, in which the content of thermosetting or thermoplastic resin in the assembly of impregnated sheet is 30-60% by weight thereof.

* * * * *